US006074614A

United States Patent [19]

Hafeman et al.

[11] Patent Number: 6,074,614

[45] **Date of Patent: *Jun. 13, 2000**

[54] MULTI-ASSAY PLATE COVER FOR ELIMINATION OF MENISCUS

[75] Inventors: Dean G. Hafeman, Hillsborough; Kimberly L. Crawford, Cupertino; Steven J. Gallagher, Palo Alto, all of Calif.

[73] Assignee: Molecular Devices Corporation, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,083

[22] Filed: Jun. 19, 1997

Related U.S. Application Data

[63] Continuation of application No. 08/479,684, Jun. 7, 1995, abandoned.

[51] Int. Cl.[7] ........................ G01N 1/10

[52] U.S. Cl. ........................ 422/102; 356/246

[58] Field of Search ........................ 422/102, 99; 435/305.3; 206/223, 569; 356/246; 250/576

[56] References Cited

U.S. PATENT DOCUMENTS

| | | | |
|---|---|---|---|
| 3,649,464 | 3/1972 | Freeman | 435/305.3 |
| 4,038,149 | 7/1977 | Liner et al. | 435/305.3 |
| 4,483,925 | 11/1984 | Noack | 422/99 |
| 4,599,314 | 7/1986 | Shami | 435/305.3 |
| 4,599,315 | 7/1986 | Terasaki et al. | 422/102 |
| 4,657,867 | 4/1987 | Guhl et al. | 435/305.3 |

*Primary Examiner*—Lyle A. Alexander
*Attorney, Agent, or Firm*—McDonnell Boehnen Hulbert & Berghoff; Steven J. Sarussi

[57] ABSTRACT

A constant pathlength multi-assay plate cover for multi-assay plates, comprising, a flat top side and a flat bottom side, the bottom side having solid cylindrical projections of equal length extending downwardly from the flat bottom side, wherein each cylindrical projection is centered about the optical axis passing through a corresponding sample well of a multi-assay plate, thereby eliminating the meniscus and evaporation effects.

13 Claims, 9 Drawing Sheets

FIG. 15
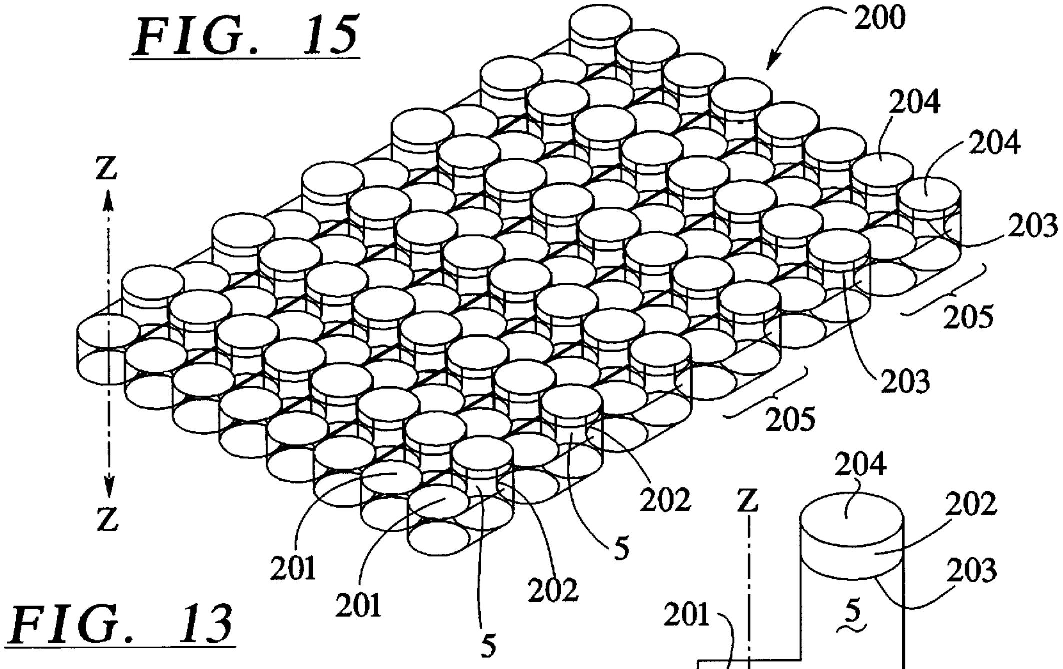
FIG. 13
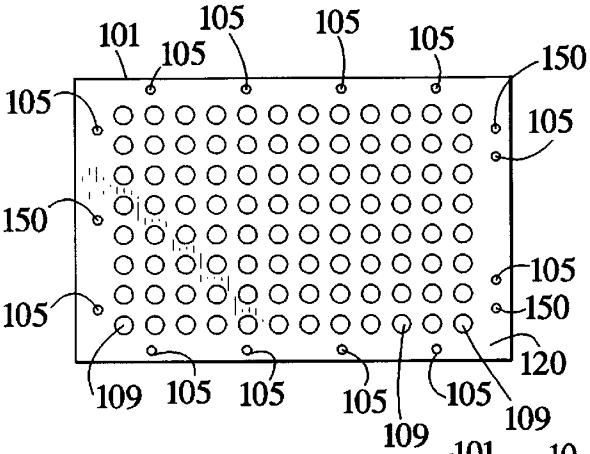
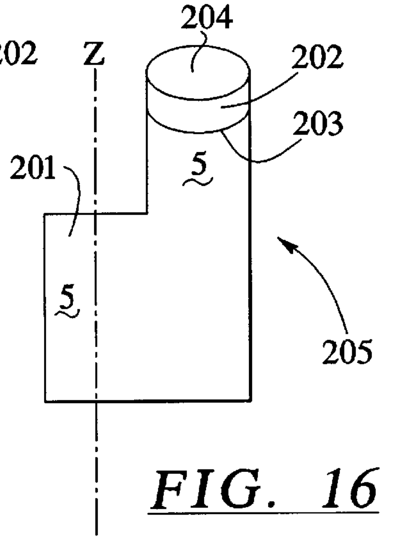
FIG. 16
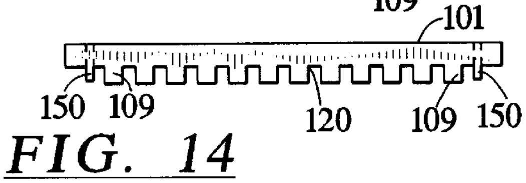
FIG. 14
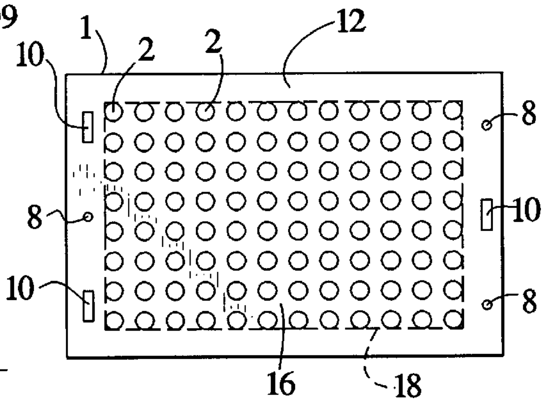
FIG. 3
FIG. 4
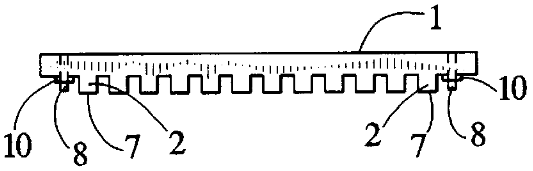

8

MULTI-ASSAY PLATE COVER FOR ELIMINATION OF MENISCUS

This application is a continuation, Ser. No. 08/479,684, filed Jun. 7, 1995, now abandoned.

BACKGROUND OF THE INVENTION

Spectrophotometers are used to measure the optical density of liquid samples placed in a cuvette, i.e., a liquid sample container having at least two parallel transparent walls. In a spectrophotometer measurement, a horizontal light beam from a light source passes through air and then into one of the parallel walls of the cuvette, then through the sample, then through the opposite parallel wall of the cuvette, and then through air where it is then detected by a light detector.

In contrast to horizontal light beam spectrophotometers, microplate readers are designed as vertical light beam photometers. In a microplate reader, a vertical beam of light is used to read the optical density of samples contained in the wells of multi-assay plates (MAPs) because the wells are arranged in rectangular arrays (e.g. 8×12). In such rectangular arrays, neighboring wells would be in the way of a horizontal light beam. In microplate readers, a vertical beam of light from a light source passes through air, but in contrast to a horizontal light beam, enters the sample directly at the air-sample interface. In a microplate reader, the light beam exits through the bottom of the multi-assay plate (MAP) and is then detected by a light detector.

When liquid samples are analyzed in a microplate reader, the light beam passes through the liquid sample at a meniscus formed at the interface between the liquid sample and the air above the liquid sample. Meniscus size and shape is determined by the physical surface properties of the MAP wells and the liquid sample contained within the well(s). Aqueous samples in MAP wells that have hydrophobic surfaces tend to form either a flat or a downwardly sloping (convex) meniscus. Aqueous samples in MAP wells that have hydrophilic surfaces, in contrast, tend to form upwardly sloping (concave) meniscus. The surface properties of the MAP wells have a direct effect on the meniscus size and shape and, ultimately, the optical pathlength through the liquid sample. Therefore, variability in pathlength through the sample is caused by any variability in the shape of the meniscus. In addition, the meniscus acts as a lens and refracts light depending on meniscus size and shape. Furthermore, refraction of light is dependent on wavelength of the light. Thus, it is not possible to completely correct for meniscus effect on the light transmission at a first wavelength by measuring the effect at a second wavelength.

Evaporation is another effect that causes several problems in photometric analysis. First, evaporation affects the concentration of the reactants as the volume of the liquid sample in the wells decreases. Second, due to the heat of evaporation, evaporation affects the steady-state temperature of the samples. Taking heat energy to change a liquid into a gas, evaporation will prevent the temperature of the sample from reaching the desired incubator temperature of the analysis chamber within the microplate reader. Third, different evaporation rates of a liquid sample within different wells of the MAP will cause the temperature of such liquid sample to vary from well-to-well. All of these three effects from evaporation result in inaccurate photometric analysis.

Evaporation is a particularly acute problem in the analysis of small volume samples (e.g. 200 μl or less) in MAP wells, because of the large surface to volume ratio. Further, evaporation tends to be a serious problem for liquid samples having an appreciable vapor pressure at ambient temperature. Evaporation is further exacerbated at elevated temperatures which are sometimes needed in an analysis. As the temperature of the MAPs are raised, the rate of evaporation increases.

Attempts have been made to reduce the problem of evaporation. For example, evaporation can be reduced by saturating the air above the wells with the vapor of the volatile liquid, e.g. water. This is best achieved by placing a sealing cover over the MAP. Vapor, however will begin to condense on the MAP cover as the air space above the liquid becomes supersaturated at the temperature of the cover. Customarily, the liquid condenses as fine beads on the cover. The condensation scatters light and significantly affects the measurement of optical density with vertical beam photometers. The light scatter appears as an increase in optical density. Furthermore, the amount of condensation frequently is not identical from well to well, thereby causing variability and error in optical density measurements.

Thus, prior to the present invention, covers for MAPs have not eliminated the problems of evaporation. In addition, prior covers did not address the problems encountered by the meniscus effect. At most, these prior covers merely reduced the harmful effect due to evaporation, and provided a benefit of maintaining samples sterile (sterility is especially important in the analysis of samples comprised of mammalian cells in culture).

Currently, an antifogging agent (e.g. Molecular Devices Cat. No. R8005) coated onto the sample side of MAP covers has been used to minimize problems due to evaporation in MAPs. The antifogging agent is applied dropwise to the inner surface of a MAP cover and is spread with an applicator or sponge. A thin translucent irregular hydrophilic film results, which in turn minimizes light scatter caused by condensation. The application of an antifogging agent to a MAPs cover is an improvement over an untreated cover, however it has problems of its own. First, the antifogging film is translucent and scatters light rather than being completely transparent. Second, the translucent cover becomes increasingly translucent as the air above the wells becomes saturated with aqueous vapor.

Thus, prior to the present invention, existing covers for MAPs, even in combination with an antifogging agent, failed to eliminate the problems of evaporation and condensation in MAPs, and moreover, did not address, let alone eliminate, the problems due to the meniscus effect.

Another multi-assay plate cover in the arts is the Nunc Immunology TSP (Nunc No. 44597 available from Fisher Scientific (Pittsburgh, Pa.) as Cat. No. 12-555-143). This cover, made of polystyrene, has 96 hollow projections having an inside diameter of 2.41 millimeters (mm) at the proximal, top portion and are tapered to 2.00 mm internal diameter at the distal, bottom portion. The distal end of the projections are completely rounded, having a radius of curvature of approximately 1.0 mm. The outside diameter of the projections is 3.96 mm at the proximal, top portion and is tapered to 3.61 mm near the distal, bottom portion, and each projection extends about 10.5 mm into the corresponding wells of a 96-well multiassay plate. The cover is designed to be used with MAPs manufactured by NUNC having 96 cylindrical wells in 8×12 rectangular arrays with the central axes of the cylindrical wells spaced at 9.0 mm intervals and each well having an internal diameter of about 6.6 mm. Examples of such MAPs are NUNC Cat. Nos. 449824, 439454, 442404, 446612, and 430431.

Still another multi-assay plate cover in the art is the Falcon F.A.S.T. multi-assay plate cover, Cat. No. 3931, manufactured by Becton Dickenson & Co. (Oxnard, Calif.) and available from Fisher Scientific as Cat. No. 08-772-26. This MAP cover, made of polystyrene, has 96 solid projections about 1.26 cm long, having a diameter of about 1.6 mm at the proximal, top portion and have a polystyrene bead of about 3.8 mm at the distal, bottom portion. The F.A.S.T. cover is designed to be used with Falcon F.A.S.T. microplate MAPs having 96 cylindrical wells in 8×12 rectangular arrays (Falcon Cat. No 3933).

A major problem with such MAP covers is that they are not usable to read the optical density of samples contained at sample sites in MAPS. Specifically, the cross-sectional area of the light-transmitting portion of the projections of the Nunc TSP and Falcon F.A.S.T. covers are very narrow. These projections, therefore, are unable to transmit light to a substantial fraction of the cross-sectional area the wells of the 96-well MAPs. Additionally both the Nunc TSP and Falcon F.A.S.T. covers fit loosely on the MAPs with which they are compatible, allowing these covers to move with sliding motion at least 0.5 mm from side to side as the multi-assay plates, with covers, are placed into a microplate absorbance reader. Because of this sliding motion, the projections are able to move, at least partially, out of any light beam intended to pass down the long axis of the projections. Also, the narrowest internal diameter of the projections is insufficient to accommodate customary light beams wider than about 1.0 mm in diameter (allowing for ±0.5 mm of optical misalignment of the light beam with respect to the long axis of the projections). With such prior art covers, light passing down the long axis of the projections strikes the internal side edges of the projections thereby causing an error in the measurement of the relative amount of light transmitted through sample sites in the MAP. Also, the projections of such prior art covers are excessively long to be used with the MAPs with which they are compatible, such that the optical pathlength, through the samples in a MAP, would be less than 2.0 mm and in some cases less than 1.0 mm. Also, the distal bottom ends of the projections are extremely rough such that any light beam traveling through the projections would be scattered greatly so as to miss the photodetector placed below the MAP wells, thus causing error in determination of sample concentration.

SUMMARY OF THE PRESENT INVENTION

A unique cover has now been discovered that eliminates the problems associated with the meniscus effect and the evaporation effect. In fact, the unique cover of the present invention eliminates both the meniscus and evaporation altogether.

In the present invention, a unique cover for a ninety-six well MAP has been designed to eliminate the problems associated with the meniscus and evaporation effects. In particular, the cover of the present invention eliminates evaporation and the fogging of multi-assay plate lids during kinetic reads at elevated temperatures. In addition, the unique cover of the present invention eliminates the meniscus from the optical path in microplate readers and creates a constant optical pathlength through each sample.

The unique MAP cover of the present invention is a functional unit together with a multi-assay plate (MAP) having a two-dimensional array of sample sites. Customarily, sample sites of the MAP are cylindrical wells arranged in a two-dimensional array, such as an 8×12 array of 96 wells, for receiving liquid samples. The wells have a top opening, internal side walls and an internal bottom surface, giving each well dimensions of both width and depth for accommodating such liquid samples. The MAP cover encloses the top opening of the wells and provides for constant optical pathlengths through such samples. The MAP cover has side edges, as well as a top side and a bottom side. Extending downward from the bottom side of the cover are a two-dimensional array of projections that extend separately into the samples in the two-dimensional array of wells, e.g. the 8×12 array of 96 wells.

Each projection of the MAP cover has side edges, as well as top and bottom surfaces. The bottom surfaces are transparent and constitute a bottom window for transmission of light into the sample sites. The narrowest portion of the side edges constitutes a top aperture that allows light to pass through the body of the projections to the bottom window. The projections may be made of solid material transparent to visible light, or alternatively may be hollow. If hollow, the projections will have both internal and external side edges together with a bottom window having both an internal and an external bottom window surface. Also, if hollow, the projections will have an opening extending from the top surface of the cover, through the cover and giving top access to the internal side edges and the internal surface of the bottom window.

The bottom windows of the projections have a smooth bottom surface that is free of scratches or other rough projections or indentations that might scatter light or that might trap air bubbles when in contact with aqueous samples. A light beam transmitted through the top aperture and bottom window then is free to travel through an optical path within a sample material, such as an aqueous sample, and subsequently passes through the bottom surface of the wells of the MAP where it is detected by photodetectors placed below the MAP, as is usual in a microplate absorbance reader. The photodetectors measure the intensity of the light beam relative to its intensity in the absence of the samples. The portion of the samples interrogated by the light beam thus is defined by the width of the light beam along the length of the entire optical pathlength within the samples at the sample sites. The invention also functions in the case where the positions of the light source and photodetectors are interchanged and consequently the direction of the light beam is reversed.

The bottom side of the MAP cover has alignment means for accurately aligning the apertures and the windows of the two-dimensional array of projections to the corresponding two-dimensional array of sample sites. Preferably, the alignment means will be alignment pins in the cover which mate with alignment holes in the MAP, or vice versa. Alternatively, the alignment means may be downwardly extending side ridges on the MAP cover that have internal and external surfaces. The internal surfaces of the ridges contact external side edges of the MAP. Still another alternative alignment means are projections with either external side-ridges or external corner-edges that contact the internal side walls of cylindrical wells of a MAP having sample sites in the form of such wells. The alignment means insures that an interrogating light beam of a microplate reader remains well within the confines of the top apertures and the bottom windows of the projections of the MAP cover.

It is a further object of the present invention to optically analyze, with a light beam, a large number of samples in a small MAP area, each analysis having minimal error due to light striking the side edges of the transparent apertures or edges of the transparent bottom windows of the projections. When sample sites are arranged in a two-dimensional array, advantageously, the sum total cross-sectional area of the apertures as a group or a sum total cross-sectional area of the bottom windows as a group is between 6% and 70% of an area circumscribed by a line passing around a closest perimeter of the two-dimensional array of projections as a group. Preferably, this value will be between 15% and 35% for solid projections and from 6% to 20% for hollow projections.

When used together with a compatible MAP, the projections are centered, by the alignment means, about central axes passing from the top openings to the bottom surfaces of the sample sites (wells) of the MAP. The maximal width of the light-carrying portions of the projections is determined by the smaller of either the cross-sectional area of the apertures, or the cross-sectional area of the bottom windows. Error, due to light striking the edges of the top apertures or the edges of the bottom window, may be minimized, while still permitting a substantial light beam cross-sectional for interrogating samples in a two-dimensional array sample sites, by constructing the MAP cover together with a MAP such that the smaller of either a sum total of the cross-sectional area of the apertures as a group, or a sum total cross-sectional area of the bottom windows as a group, will be between 15% and 95% of a sum total cross-sectional area of the sample sites in the MAP as a group. Preferably, this value will be between 40% and 60%.

The projections, however, do not completely fill the cross-sectional area of such sample site wells, thus allowing sufficient space between the outer edges of the projections and inner walls of the sample site wells for displacement of liquid samples and air or bubbles, residing in or above the samples, as the cover is placed on a MAP containing such liquid samples. Thus, such air or bubbles are displaced to sample regions outside of the portion of the samples interrogated by the optical light beam when the cover is placed on the MAP.

Preferably, the width of the narrowest part of the light-carrying portion of the projections will be at least 2.5 millimeter (mm) from side edge surface to side edge surface. When used in combination with a compatible MAP having sample sites in the form of wells, the projections of the cover are sufficiently long to contact liquid samples placed in the wells but are sufficiently short so as to allow at least 1.0 mm of space, as optical pathlength through a sample material residing in the wells. That is, the space between the bottom surfaces of the windows and the internal bottom surfaces of the wells will be at least 1.0 mm. Preferably, this value will be between 3.0 mm to 10.0 mm. Preferably, the length of the projections will be at least 3 mm long but less than 10 mm. More preferably, the projections will be between 4 and 8 mm long. The bottom surfaces of the projections generally will be flat to minimize refraction of light passing through the windows. The edges of the bottom windows, however, may be rounded advantageously to assist in the displacement of air bubbles in liquid samples to outside of the side edges of the projections, thereby to displace such air bubbles out of an optical path passing through the samples. Preferably, however, the bottom window will have a smooth bottom surface free of ridges or roughness so as to minimize scatter of the light beam and to minimize trapping of small air bubbles.

In a preferred embodiment, the unique cover of the present invention is molded out of a clear plastic material, such as polystyrene, and has a flat top side with ninety-six (96) separate solid cylindrical projections which extend from a flat bottom side of the cover, into 96 separate wells of a 96-well MAP. The solid projections are 5.1 mm in diameter and 7.2 mm in depth. The bottom surface of the projections form the bottom surface of the bottom windows. This surface is flat generally with rounded edges to allow air bubbles to be displaced easily by the sides of the projections. This construction prevents air bubbles from being trapped in optical paths traveling along rotational axes of the cylindrical projections. After molding of the MAP cover, the bottom surface of the cover is treated so as to increase the hydrophilicity of the bottom surfaces of the projections (e.g. with an oxygen plasma). Thus, trapping of air bubbles on the bottom surfaces can be substantially avoided.

The MAPs of the preferred embodiment are flat-bottom multi-assay plates having an 8×12 array of 96 wells, such as a flat-bottom Nunclon® Microwell® MAP, Nunc Cat. No. 269620 (available from Fisher Scientific as Cat. No. 12-565-226). The MAP wells have about 6.6 mm internal diameter. In the preferred embodiment, the cross sectional areas of the top apertures and the bottom windows of the projections are the same and are about 57% of the cross-sectional area of sample site wells of the MAP. Alternatively, for covers of the present invention with hollow projections, the light-carrying portion of hollow projections will be about 30–40% of the cross-sectional area of sample site wells of such compatible MAPs. Thus, with either solid or hollow projections, a measurement light beam passing through the top aperture and bottom window of the projections can interrogate a substantial portion of the cross-sectional area of samples present at the sample sites, without striking any side edge of the top aperture or bottom window, thereby avoiding light transmission measurement errors.

When the wells of the MAP are filled with 200 microliters of liquid per well and the cover of the present invention is placed onto the MAP, the projections of the cover are submerged just below the liquid level. The resulting displacement of liquid results in elimination of any meniscus from the optical path passing through the samples. Also, air bubbles are thereby displaced to regions between the external side walls of the projections and the internal side walls of the wells, which are then out of the light path.

The present invention eliminates optical errors in measurements of optical properties of liquid samples at sample sites in a MAP by virtue of providing for the following within optical paths of an interrogating light beam:

a) elimination of condensation on the surfaces of a MAP cover that are in the optical paths;

b) elimination of reflections of interrogating light at gas-liquid interfaces at liquid sample surfaces that are in the optical paths;

c) elimination of refraction of interrogating light at any curved meniscus formed by such gas-liquid interfaces;

d) elimination of light striking the side edges of projections of a MAP cover; and e) establishment of a constant optical pathlength through liquid samples at sample sites in a MAP.

Thus, the present invention is a combination of unique improvements in MAP covers that result in a constant optical pathlength, of constant geometry, through liquid samples at sample sites in the MAP.

Thus, the present invention results in a constant optical pathlength through the liquid sample in each well and at the same time removes the optical errors associated with the meniscus as mentioned previously in the prior art. For each well, the individual pathlengths for each well may be determined utilizing the Beer-Lambert Law, $$OD=\epsilon lc$$

where $\epsilon$ is the extinction coefficient for the analyte, l is the optical pathlength, and c is the concentration of analyte. The Beer-Lambert Law basically states that the optical density ("OD") of a solution is proportional to the number of the light absorbing molecules (analyte) through which the light passes. A plot of OD versus concentration for a fixed optical pathlength will yield a linear relationship for a pure compound which has an extinction coefficient that is independent of concentration.

By way of example, the preferred cover of the present invention may be cut and machined from a piece of clear polycarbonate and then lapped and vapor polished to increase optical clarity. The lapping and vapor polishing removes the small scratches and protrusions and therefore reduces the wavelength-dependent light scattering.

In the preferred embodiment, alignment pins are placed in the cover to align the cylindrical projections over the wells of a MAP. The alignment pins are placed to correspond to existing alignment holes within the preferred Nunc MAPs. Alternatively, new alignment holes may be drilled into MAPs at suitable locations to receive the alignment pins of the cover.

BRIEF DESCRIPTION OF THE DRAWINGS OF THE PREFERRED EMBODIMENTS

FIG. 3 is a bottom view of the preferred embodiment of the cover shown in FIG. 1.

FIG. 4 is a side view of the preferred embodiment of the cover shown in FIGS. 1 and 3.

Figure 5:
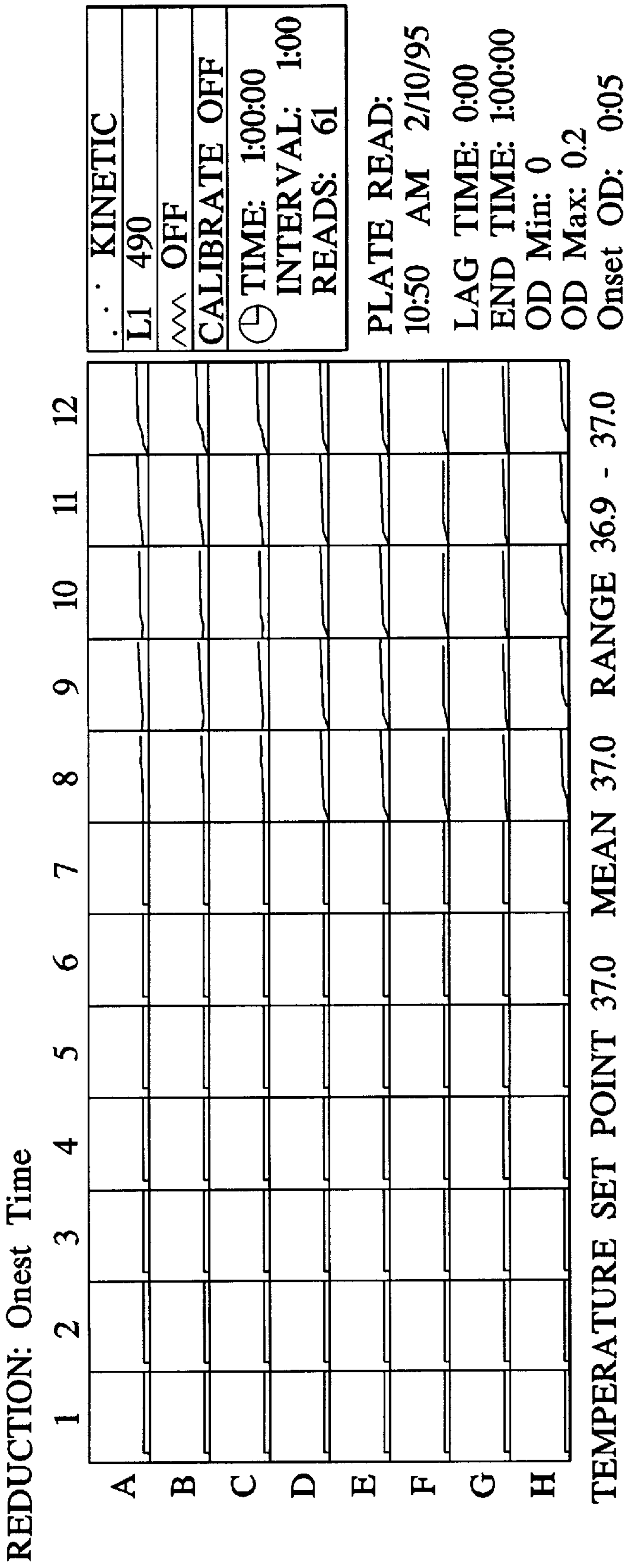

FIG. 5 is a plot that shows the changes in optical density ("OD") in ninety-six wells of a MAP 4 during a one hour kinetic reading run for MAP 4 containing acid orange 8, initially at 23° C., wherein the preferred embodiment of the cover of the present invention is used along with a ThermoMAX™ (by Molecular Devices Corporation, Sunnyvale, Calif.) microplate reader with the chamber of the microplate reader preheated at 37° C.

Figure 6:
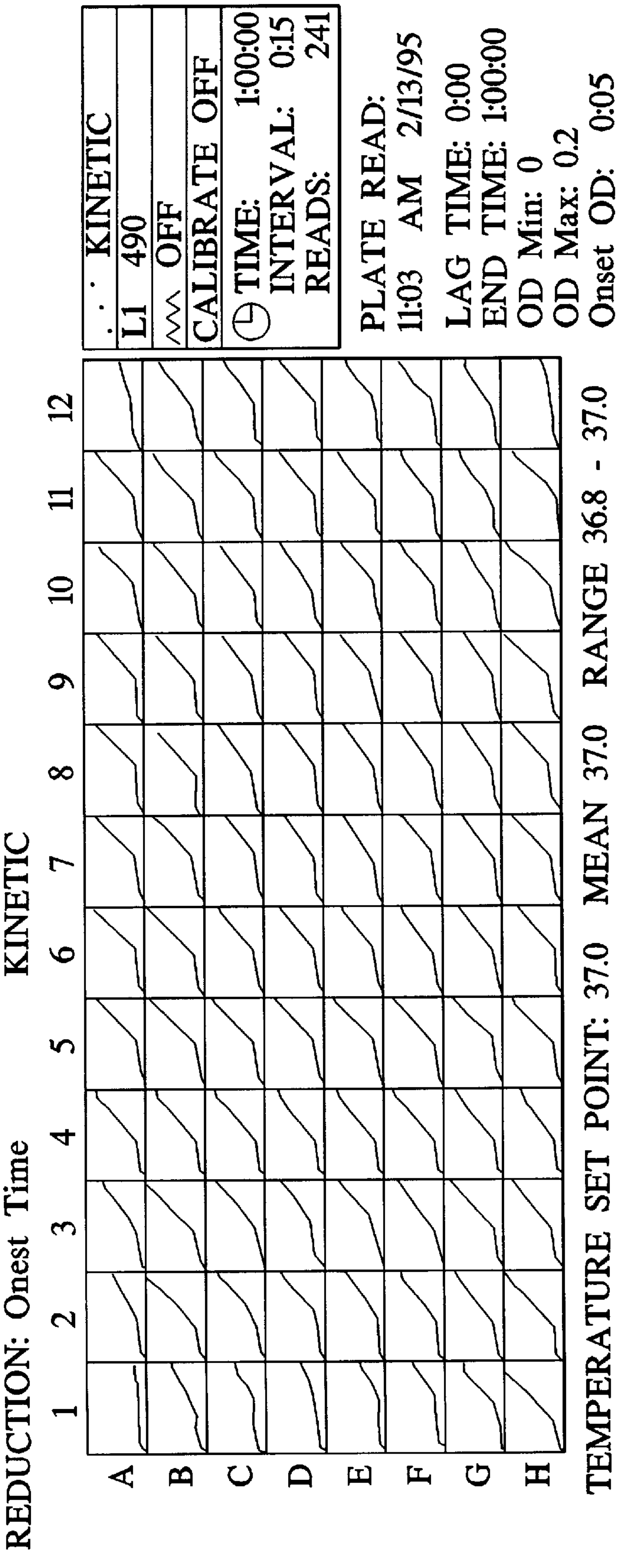

FIG. 6 is a plot that shows the changes in optical density in ninety-six wells of the same MAP 4 used in the readings shown in FIG. 5 during a one hour kinetic reading run for MAP 4 containing acid orange 8, initially at 23° C., wherein a prior art cover is used along with a ThermoMAX (by Molecular Devices Corporation, Sunnyvale, Calif.) microplate reader with the chamber of the microplate reader preheated to 37° C.

Figure 7:
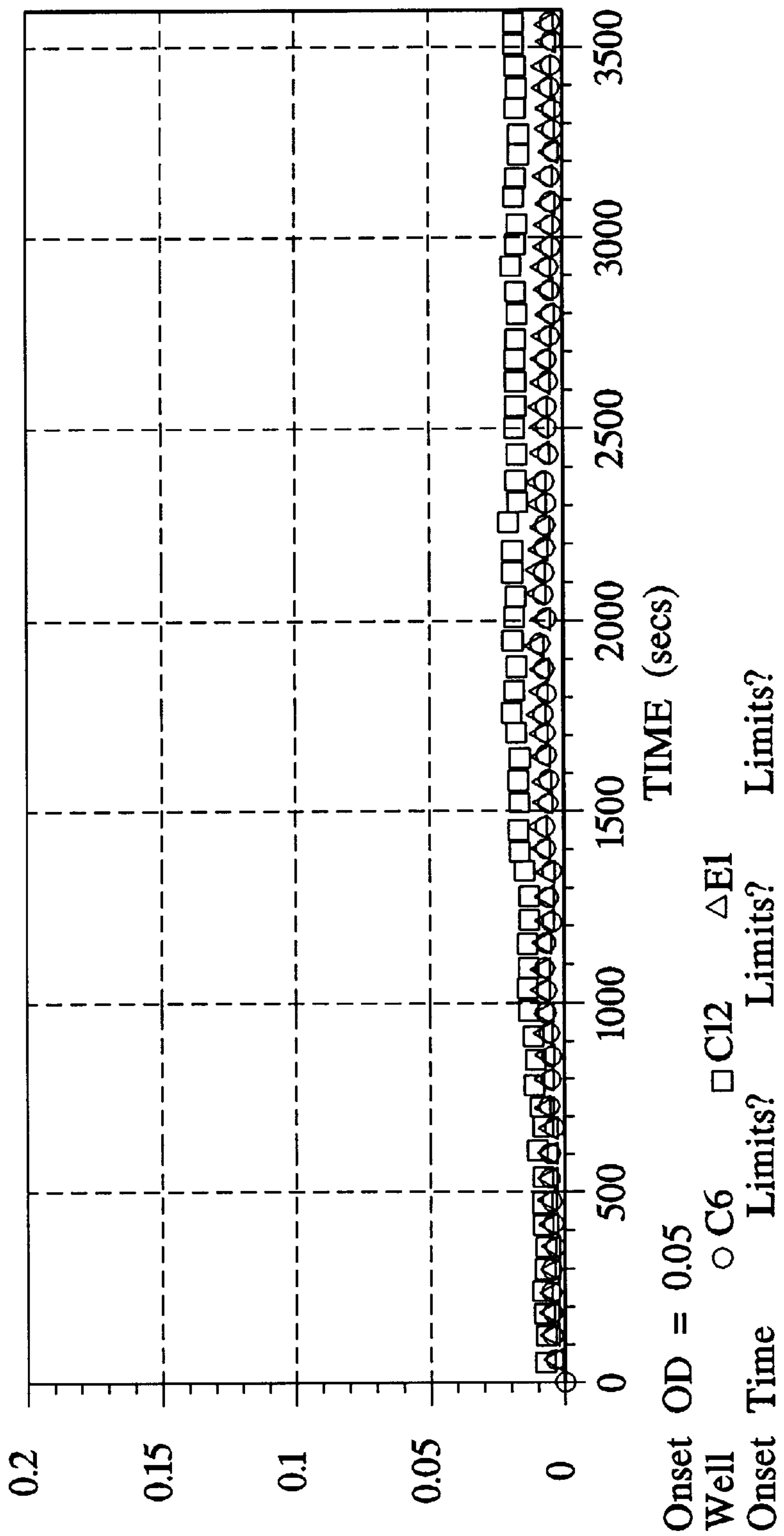

FIG. 7 is a plot of OD versus time and that shows selected individual well data from MAP 4 wherein the preferred cover of the present invention was used.

Figure 8:
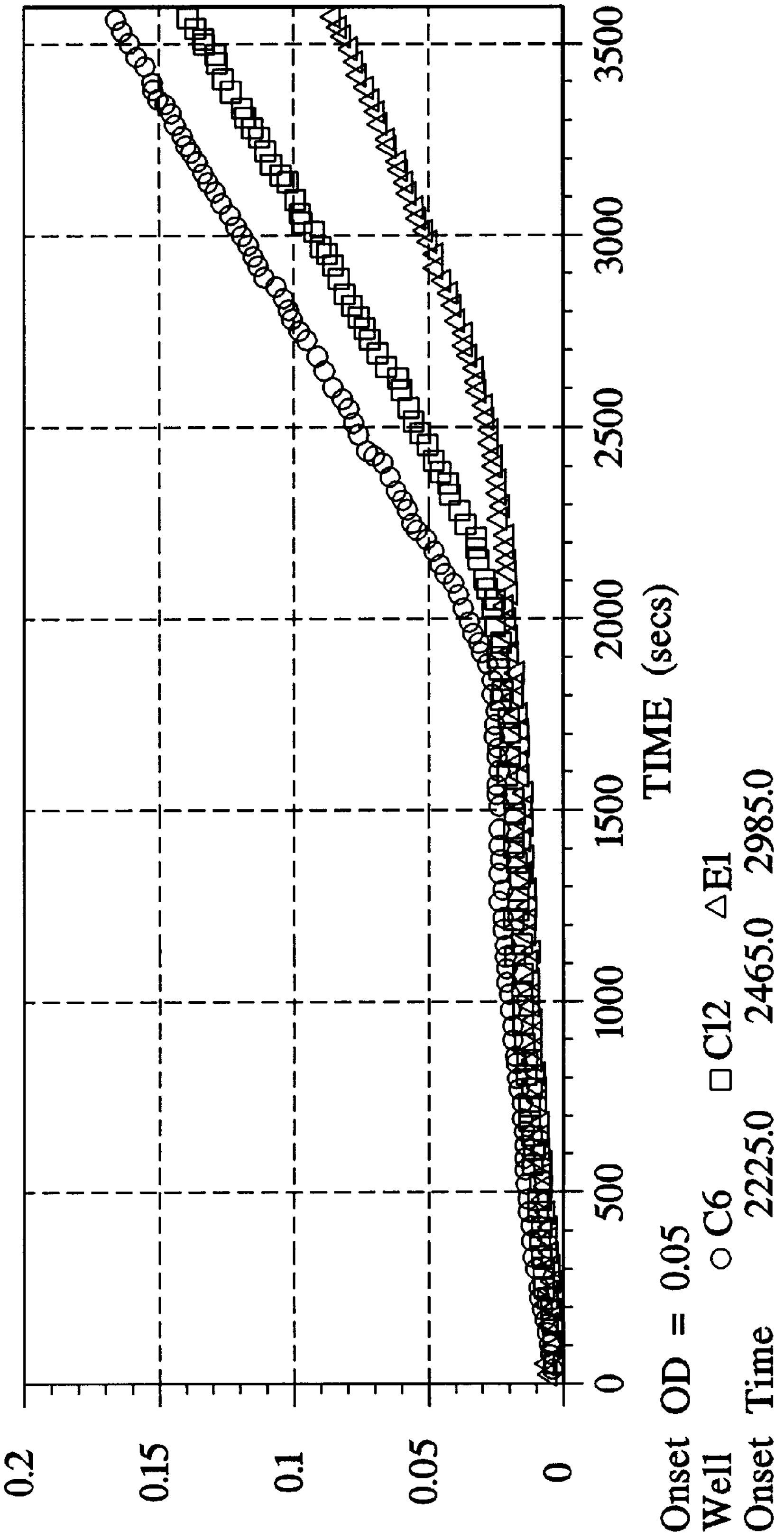

FIG. 8 is a plot of OD versus time and that shows selected individual well data from MAP 4 wherein a prior art cover was used.

Figure 9:
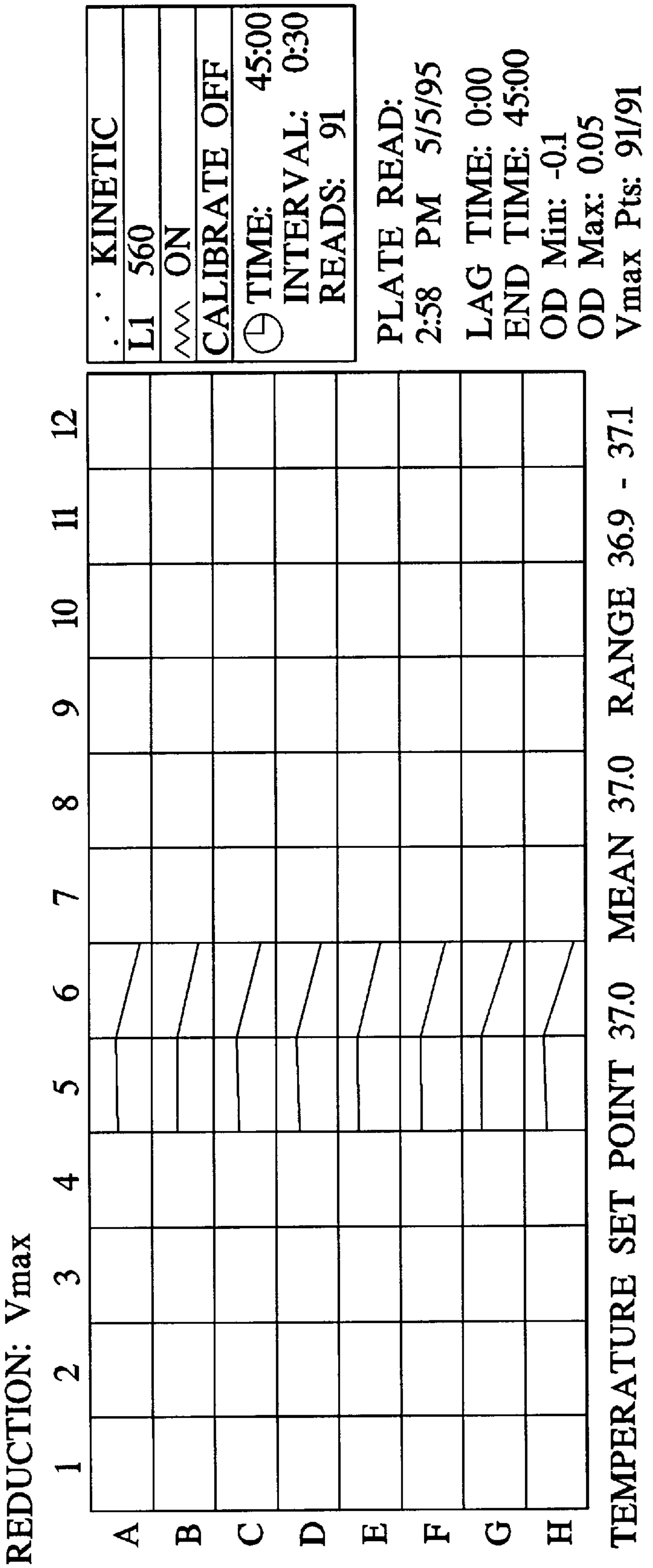
Figure 10:
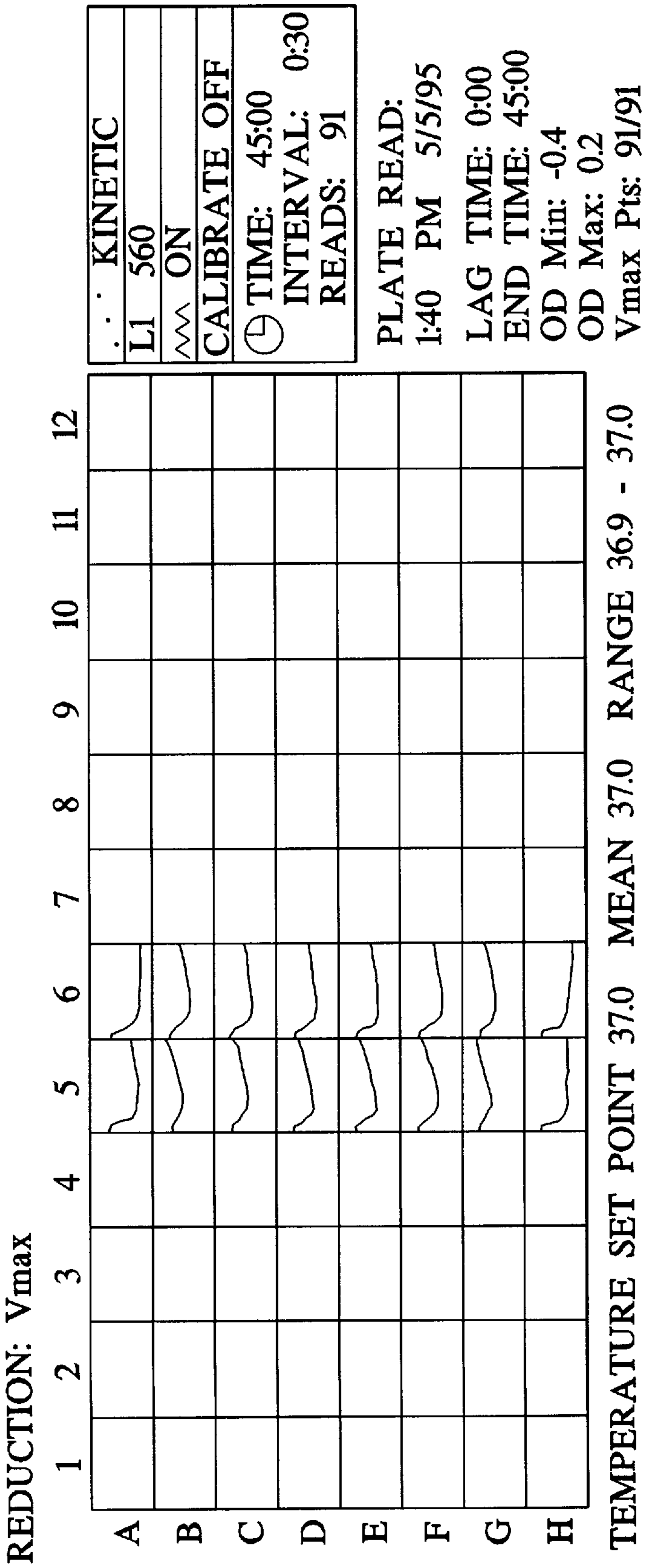

FIGS. 9 and 10 illustrate the improved results of using the cover of the present invention versus a prior art cover.

Figure 11:
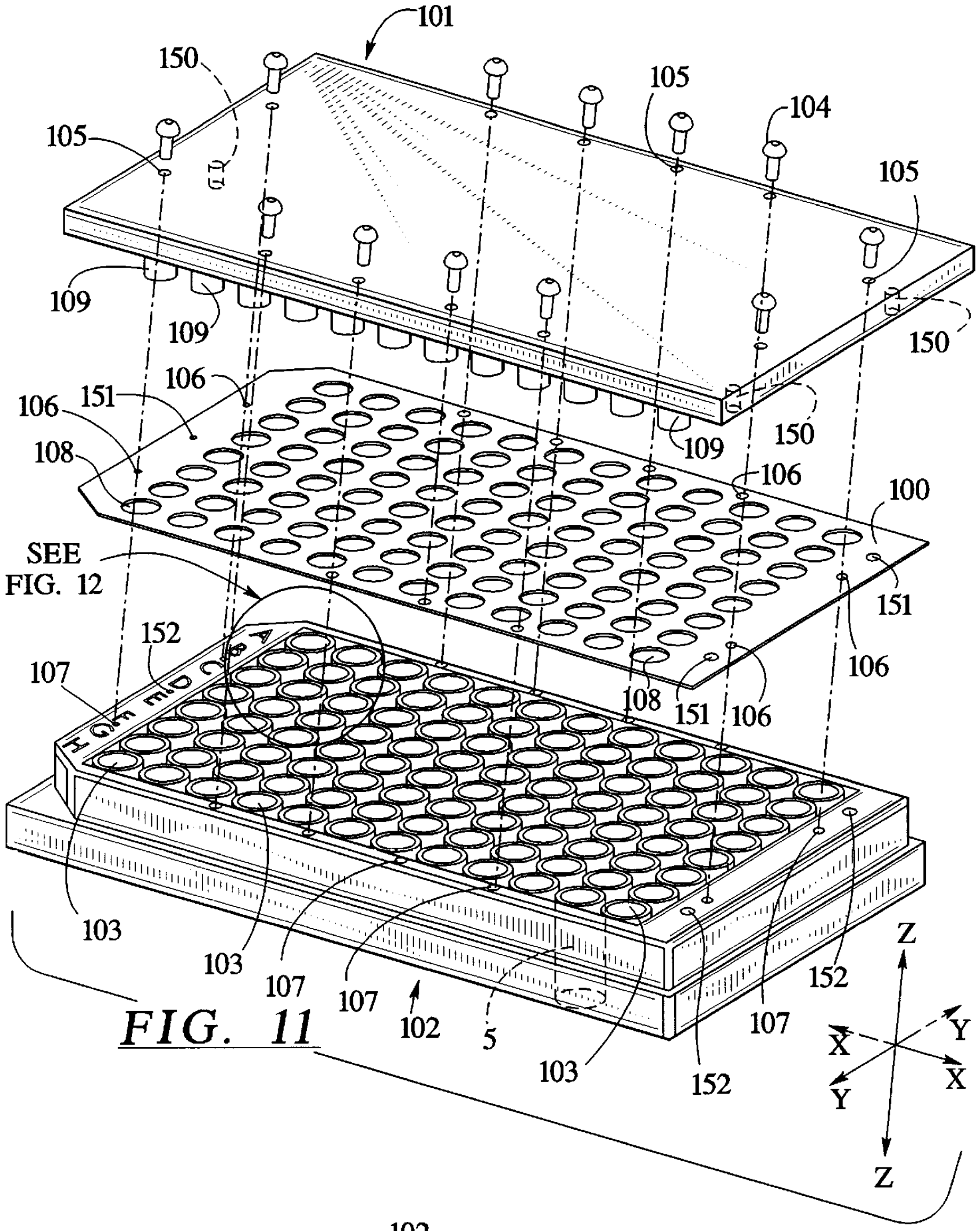

FIG. 11 is a perspective, exploded view of another preferred cover of the present invention wherein a sealing gasket is used between the cover and a multi-assay plate ("MAP").

Figure 12:
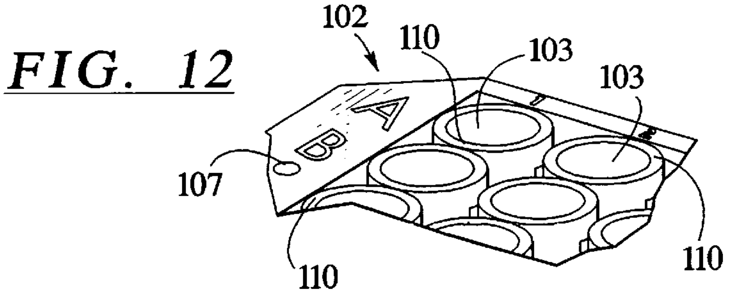

FIG. 12 is an enlarged cut-away view of a corner of the MAP shown in FIG. 11.

FIG. 13 is a bottom view of the cover shown FIG. 11.

FIG. 14 is a side view of the cover shown in FIGS. 11 and 13.

FIG. 15 is a perspective, exploded view of another preferred embodiment of the present invention.

FIG. 16 is a side view of a single well 205 of MAP 200 shown in FIG. 15.

DETAILED DESCRIPTION OF THE PREFERRED EMBODIMENTS

As shown in FIGS. 1 through 4, a preferred embodiment of the present invention has a cover 1. Cover 1 has ninety-six cylindrical projections 2 that are aligned with the corresponding ninety-six wells 3 of a multi-assay plate ("MAP") 4. Cylindrical projections 2 are centered about an optical axis passing down the axis of rotation of corresponding cylindrical wells 3, and parallel to axis Z—Z shown in FIG. 1. Cylindrical projections 2 have a diameter of 5.08 mm and a length of 7.20 mm extending from a flat bottom surface 12 of the cover 1. Wells 3 of MAP 4 are identified by corresponding letters A through H (that identify rows of wells 3 in MAP 4) and corresponding numbers 1 through 12 (that identify columns of wells 3 in MAP 4). The top surface 6 of cover 1 is flat. Further, cylindrical projections 2 are flat at their distal, bottom end 7.

When the cover 1 is placed on MAP 4, the cylindrical projections 2 fit into wells 3. When wells 3 contain 200 ul of liquid samples 5, and cover 1 is placed on MAP 4, the bottom surfaces 7 of the projections 2 submerge just below the liquid level and displace liquid and bubbles to the side of the projections 2. When used in this intended manner, the cover of the present invention eliminates the meniscus effects and the problems associated therewith. In addition, the cover 1 eliminates the evaporation effect and the problems associated therewith.

By way of example, the preferred cover 1 of the present invention may be cut and machined from a piece of clear polycarbonate and then lapped and vapor polished to increase optical clarity. The lapping and vapor polishing removes the small scratches and protrusions to reduce the wavelength-dependent light scattering.

The cover 1 can be made of any suitable optically transparent material, e.g. polymethyl methacrylate, 4-methylpentene-1 based polyolefin (sold by Mitsui Petrochemical Industries, Ltd. of Toyko, Japan under the trademark TPX), polystyrene, polypropylene, plexiglass, glass, or quartz. In particular, it is contemplated that ultraviolet-radiation-transparent materials, e.g. ultraviolet-radiation-transparent polyethylenes, can be used to as the material from which to make the cover, as well as the MAP (see U.S. Ser. No. 08/228,415).

Figures 1, 2:
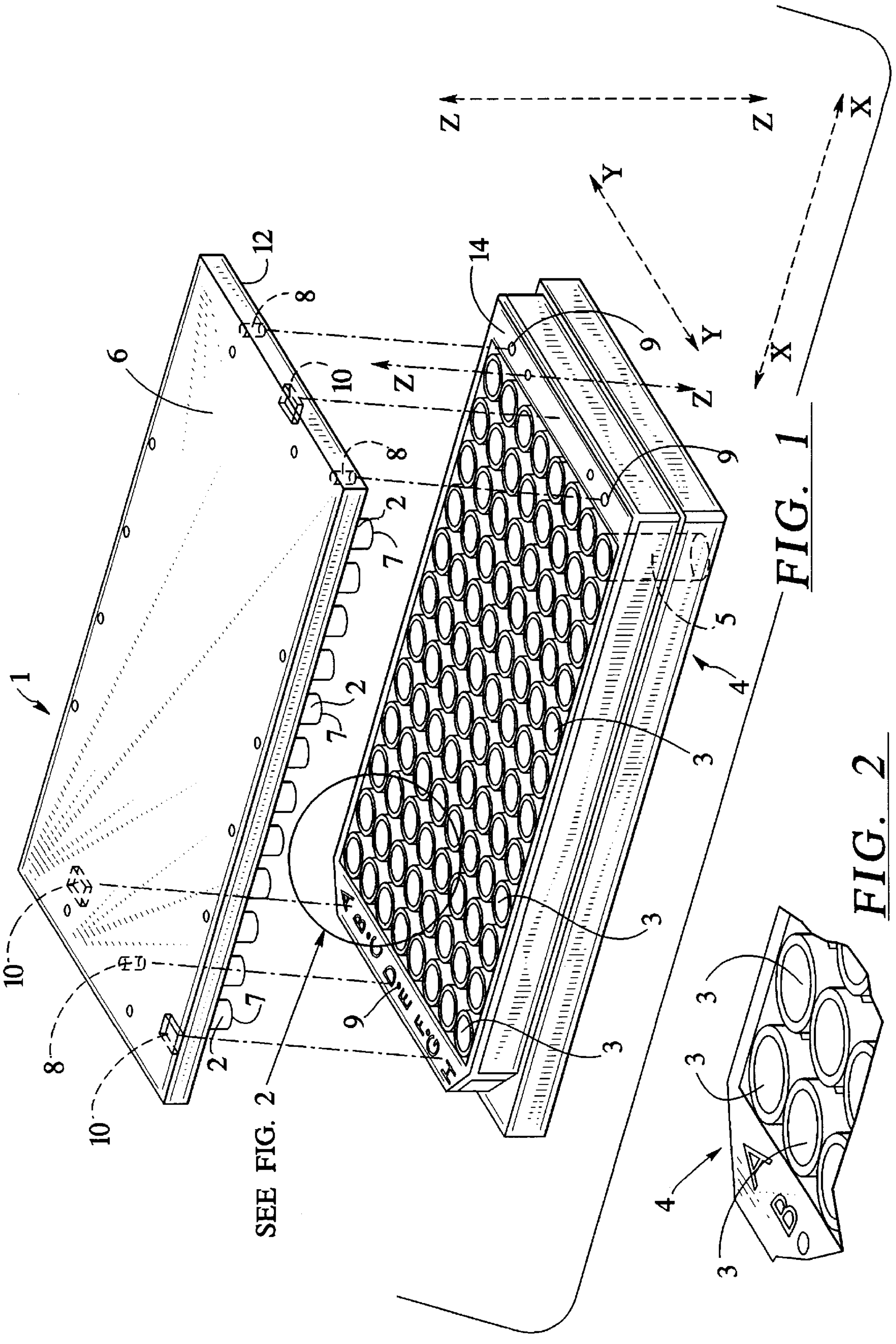
FIG. 1 is a perspective, exploded view of a preferred embodiment of the cover of the present invention in combination with a ninety-six well MAP.
FIG. 2 is an enlarged cut-away view of a corner of multi-assay plate ("MAP") 4.

As also shown in FIG. 1, cover 1 has alignment pins 8 that correspond to holes 9 defined in MAP 4 which is a Nunc No. 269620 flat-bottom MicroWell™ MAP, available from Fisher Scientific as Cat. No. 12-565-226. When cover 1 is placed over MAP 4, the alignment pins 8 are inserted into holes 9, thereby aligning the projections 2 over and into the wells of MAP 4. In addition, the insertion of the alignment pins 8 into holes 9 acts to secure cover 1 over MAP 4 in the X—X axis and the Y—Y axis shown in FIG. 1.

Alternatively, new alignment holes 9 may be drilled into MAP 4 at suitable locations to receive the alignment pins 8 of the cover 1.

In addition, the cover of the present invention may have alignment tabs 10 that ensure a constant optical pathlength through the liquid 5 in each well 3 parallel to the Z—Z axis as shown in FIG. 1. As shown in FIG. 1, one method of accomplishing this task is to add three tabs 10 to the bottom of cover 1. These three tabs 10 provide a stable three-point contact between the bottom surface 12 of cover 1 and the top surface 14 of MAP 4, thereby eliminating possible irreproducibility due to warping or bowing of cover 1 or MAP 4 due to stresses in the materials used to make the cover 1 and MAP 4. Warping and bowing results in shifting or rocking of the cover 1 with respect to the MAP 4 in the Z—Z axis shown in FIG. 1. Therefore, the tabs 10 increase the repeatability of individual well optical pathlength during repetitive optical measurements. This is especially useful in cases where the MAP 4 may be moved, disturbing the positioning of cover 1 during repetitive measurements. The three tabs 10 slightly elevate (i.e. space apart) the invented cover from the MAP 4 allowing for more reproducible positioning of the cover 1 in the vertical direction along the optical path through the samples (the Z—Z axis).

In still another embodiment of the invention, the cover 1 with the tabs 10 could be sealed to the MAP 4 by using parafilm, or similar sealing film such as polyethylene, saran, or the like. This sealing step reduces evaporation that will occur if a measurement is made at elevated temperatures or if repeated measurements are made over long durations of time, such as one to twenty-four hours.

In the preferred embodiment, the light-carrying portion of the solid cylindrical projections 2 is of a constant 5.08 mm diameter. The inner diameter of the cylindrical MAP wells 3 is about 6.6 mm. Thus, the smallest cross-sectional area of the light-carrying portions of solid projections, constituting a top aperture, is about 0.203 $cm^2$, which is about 57% of the cross-sectional area of sample site wells of a compatible MAP. The bottom surfaces 7 of the projections form a bottom window of equal diameter and cross-sectional area. Thus, a measurement light beam passing through the top aperture and bottom window of the projections can interrogate a substantial portion of the cross-sectional area of samples present at the sample sites, without striking any side edge of a projection, thereby avoiding light transmission measurement errors.

In the preferred embodiment, the total of the smallest cross-sectional areas of the light-carrying portion of all 96 projections, about 19.5 $cm^2$, is about 27.5% of the area 16 circumscribed by a closed loop 18 passing around the outermost perimeter of the projections 2.

The following examples demonstrate that use of the cover 1 of the present invention acts to eliminate meniscus and evaporation effects and the problems associated therewith.

EXAMPLE 1

First, 200 $\mu$l of Acid Orange 8 (dissolved in water) was placed, using a pipet, into all ninety-six wells of a flat bottom MAP 4 made by NUNC (Nunclon® Delta, Nunc No. 167008, available from Fisher Scientific as Cat. No. 12-565-66). Cover 1 was placed on the MAP 4, and care was taken not to trap any bubbles below the projections 2 of the cover 1. When the cover 1 was placed on MAP 4 containing 200 $\mu$l of liquid/well, the projections 2 submerged just below the liquid level, thereby displacing liquid and bubbles to the sides of the projections 2. A strip of parafilm was wrapped around the perimeter of the MAP 4, thus sealing the cover 1 to the MAP 4 and to prevent any evaporation at the corners and edges of MAP 4 during kinetic reads (i.e. determination of optical density vs. time) with elevated temperatures. The incubator of a ThermoMAX™ microplate reader was allowed to preheat to 37° C. for approximately 30 minutes. Then, the MAP 4 containing Acid Orange 8 at room temperature was read kinetically for 1 hour, recording the optical density at 490 nm every 15 seconds, in the preheated ThermoMAX™ microplate reader.

Shown in FIG. 5 are the changes in OD over the 1 hour kinetic read for the MAP 4 containing Acid Orange 8 and using cover 1. Shown in FIG. 6 are the changes in OD over a 1 hour kinetic read for the same MAP 4 containing Acid Orange 8, initially at room temperature (about 23° C.), and covered with a prior art cover called Nunclon® Delta that is sold as a unit with the Nunclon® Delta MAP. The measurements using the cover 1 of the present invention had an average starting optical density of 0.769 and an average ending optical density of 0.776. The same type of measurements using the Nunclon® Delta cover, in place of the cover 1 of the present invention, has an average starting optical density of 0.906 and an average ending optical density of 1.058. The average change in optical density was 7 mOD for the plate covered with the invented cover and 152 mOD for the plate with the Nunclon® Delta prior art cover. Ideally, there should be no change in optical density over time. The large change observed, as well as the large starting optical density observed, when the prior art cover was used mainly was due to fogging of the internal surface of the prior art cover. Thus, as shown in a side-by-side comparison, the average change in optical density and measurement error is many times less when the cover 1 of the present invention is used than when a prior art cover is used.

FIGS. 7 and 8 contain data plots of OD versus time for three selected wells (i.e. C6, C12 and E1) where the plots have been enlarged for a more detailed comparison. FIG. 7 shows the relatively small OD increases when the cover 1 of the present invention is used. FIG. 8 shows the much larger OD increases when the prior art Nunclon® Delta cover is used. A comparison of FIG. 7 and FIG. 8 illustrates that when the prior art cover is used, the result is that significant variable OD increases of from 0.030 to 0.170 OD units occur (i.e., beginning at 1800 seconds). On the other hand much smaller variable OD increases occur when the cover of the present invention is used. This variable OD increase is attributed to the meniscus and evaporation/condensation (fogging) effects that are greater when a prior art cover is used than when the cover of the present invention is used. The same wells in FIG. 7 show no significant variable OD increases over time.

EXAMPLE 2

Simultaneous monitoring of the extracellular acidification of TF-1 cells in a microplate reader that normally causes aqueous samples to fog MAP covers at elevated temperatures is now possible when the cover of the present invention is used in place of a standard Nunclon® Delta MAP cover. A flat bottom Nunclon® Delta multi-assay plate identical to that used in Example 1 (96 assay sites arranged in twelve columns, numbered 1 through 12 and eight rows, identified as letters A through H) was used in the present example. A volume of 125 $\mu$l of running media was placed in assay sites in column Nos. 5 and 6. Running media was composed of balanced salts solution (BSS), 1 mg/ml human serum albumin, 0.7 mM HEPES and 20 mg/L phenol red. The BSS contained 0.6 mM $MgCl_2$—$6H_2O$, 3.0 mM KCl, 1.0 mM $KH_2PO_4$ anhyd., 10 mM D-glucose, 0.3 mM $CaCl_2$—$2H_2O$, and 130 mM NaCl.

Next, a total of about 200,000 TF-1 cells in 75 $\mu$l of ice cold running media were pipetted into selected assay sites (column No. 6) and 75 $\mu$l of cold running media was pipetted into selected control sites (column No. 5), thereby bringing the total volume in each assay site up to 200 μl. The cells were grown in a T-75 tissue culture flask at 37° C. with 5% $CO_2$ in media consisting of RPMI 1640 with 2 mM glutamine, 10% fetal bovine serum, 100 mM sodium pyruvate, 50 μM beta-mercaptoethanol, and 1 ng/ml GM-CSF (Granulocyte-Macrophage Colony-Stimulating Factor), and were prepared by washing twice and resuspending the cells in cold running media (of about 0–10° C.) to $2.67 \times 10^6$ cells/mL and then stored on ice. All other assay sites contained 200 μl of water in order to maintain uniform temperature and humidity in the MAP.

The MAP was covered with a standard (Nunclon® Delta) MAP cover and placed in the reading chamber of a ThermoMAX™ multi-assay plate absorbance reader (made by Molecular Devices Corporation, Sunnyvale, Calif.) and preheated to 37° C. The MAP was allowed to equilibrate 20 minutes within the absorbance reader chamber with a 3 second "automix" at 30 second intervals. At the end of the 20 minute equilibration period, the standard MAP cover was replaced with the cover of the present invention and the optical density values at 560 nm were determined at 30 second intervals for 45 minutes with the 3 second "automix" prior to each determination. Operation of the ThermoMAX™ instrument including the "automix" is described further in the *ThermoMAX Microplate Reader User's Manual* which is incorporated herein by reference.

FIG. 9 shows the results of the above experiment. The assay sites in column No. 6, containing running media and cells, shows continuously decreasing optical density of phenol red, measured at 560 nanometers ($OD_{560}$), caused by acidification of the running media by the TF-1 cells. The rates of $OD_{560}$ change ranged from −1.40 to −1.79 mOD/min due to the metabolism by the TF-1 biological cells. The control assay sites in column No. 5, having no cells, in contrast, showed very little change in $OD_{560}$.

EXAMPLE 3

FIG. 10 shows the results of the above experiment repeated, but employing a standard MAP cover instead of the cover of the present invention. In contrast to the previous case where the cover of the present invention was used, changes in $OD_{560}$ were erratic, nonmonotonic and spanned a relatively large range. The individual plots ($OD_{560}$ versus time) in FIG. 10 are "windowed" over a significantly larger range totaling 0.6 optical density units, whereas the results obtained with the cover of the present invention (FIG. 9) are windowed over a smaller range totaling 0.15 optical density units. When the standard MAP cover was used, the replicate $OD_{560}$ measurements were not-reproducible for either the assay sites having TF-1 cells or for the control assay sites. The non-reproducibility is attributed to light scattering caused by water droplets (i.e., fog) which forms on the standard MAP cover. The water droplets scatter light of interrogating light beams within the absorbance reader, thereby causing large errors in the measurement of light transmittance through the sample sites covered by the standard MAP cover. Initially, the optical densities for the first few points are high, followed by a period of rapid decrease, ending with a period of slow variable increase. These erratic effects are seen both in assay sites with the TF-1 cells and control sites without the cells. Therefore, no useful biological information could be obtained with the multi-assay plate having the standard MAP cover.

EXAMPLE 4

First 200 microliters of pure water was placed, with a pipette, into all ninety-six (96) sample site wells of a Nunc No. 269620 flat-bottom MicroWell™ MAP. Such MAPs are available from Fisher Scientific as Cat. No. 12-565-226. Secondly, MAP cover 1 was placed on the MAP 4. Care was taken not to trap any bubbles below the projections 2 of the cover 1. The optical path through the water, as measured with a mechanical calipers, was 3.3 mm. Thirdly, the MAP with attached cover, was placed in a Thermomax™ microplate absorbance reader at room temperature (about 23° C.) and the optical densities of the sample sites were measured at 650 nanometers. The measured optical densities of the ninety-six sample sites containing pure water ranged from 0.076 to 0.167 optical density units. Thus, the optical density at 650 nanometers was less than 0.170 in all of the sample sites, with a range of 0.091 optical density units between all ninety-six sample sites. Repeated measurements were highly reproducible with an observed precision variation of only about 0.001 optical density units for the repeated measurements. Thus, extremely reproducible optical density results may be obtained with aqueous samples by first subtracting a "water blank" so determined at each sample site.

Next, the above measurements were repeated except that a prior art MAP cover was used instead of the cover of the present invention. The prior art cover was a Nunc Immunology TSP cover (Nunc No. 44597) available from Fisher Scientific (Pittsburgh, Pa.) as Cat. No. 12-555-143. In spite of the fact that the projections of the prior art cover very nearly touched the bottom of the MAP wells (i.e. the optical pathlength through the pure water samples was less than 1.0 mm) and the bottoms of the projections were very near the photodetectors, the optical density of the sample sites, measured at 650 nanometers, was comparatively high and extremely variable. These optical densities, as measured with the Thermomax™ microplate absorbance reader at room temperature, ranged from 0.296 to 0.725 optical density units for the ninety-six sample sites. Thus the optical density of none of the sample sites was less than 0.170 optical density units. Furthermore, the range of optical density values was 0.429 which is quite high compared to the range of 0.091 observed with the cover of the present invention. Further, repeated measurements were highly irreproducible with an observed precision variation of from 50 to 100 times greater than that observed with the cover of the present invention. Thus, the prior art MAP cover was found to be totally unacceptable for use in determining a precise "water blank" for use in the invented method.

Further Embodiments of the Invention

As shown in FIGS. 11–14, in another preferred embodiment of the present invention, a sealing gasket 100 can be placed between the cover 101 and the MAP 102 in order to seal the liquid samples within wells 103 from the atmosphere. Because the gasket 100 and screws 104 act to fix the cover 101 to MAP 102, there is no need to have tabs 10 (as for cover 1 in FIGS. 1–4) in order to stabilize the cover 101 over the MAP 102 in the Z—Z axis. The cover 101 and the sealing gasket 100 can be connected onto the MAP 102 by using screws 104 that fit into holes 105 defined by cover 101, holes 106 defined by sealing gasket 100, and holes 107 defined by MAP 102.

The above described embodiment is particularly suitable for applications where evaporation or the possibility of spillage from the wells 103 of the MAP 102 would be a significant problem without the cover 101 of the present invention. The sealing gasket 100 can be made of any suitable chemical resistant material, e.g., silicone rubber, neoprene rubber, Teflon, or the like.

As shown in FIGS. 11 and 12, the sealing gasket 100 defines circular holes 108 to accommodate the projections 109 of cover 101. For example, for use with a ninety-six well MAP 102, there are ninety six holes 108 defined by sealing gasket 100 that will accommodate the ninety six corresponding projections 109 of cover 101, and holes 106 to accommodate screws 104. In the embodiment, cover 101 and sealing gasket 100 can be securely fastened to MAP 102, after liquid samples 5 have been placed into wells 103 of MAP 102.

Further, sealing is facilitated by having raised ridges 110 around each well 103 of MAP 102. The raised ridges 110, which preferably are about 100 microns to 1 mm in height and width, function to permit the sealing gasket 100 to apply pressure on the raised ridges 110 in order to form a sealing ring of the sealing gasket 100 on the raised ridges 110 of each well 103 of MAP 102. The pressure of the sealing ring ensures that the liquid samples in each well 103 will not spill, or leak, when the filled MAP 102 is shaken or inverted. In addition, the pressure of the sealing ring reduces evaporation of the liquid samples 5 in the wells 103 of MAP 102.

As also shown in FIGS. 11–14, cover 101 has alignment pins 150 that correspond to holes 151 defined in gasket 100 and holes 152 defined in MAP 102.

In operation, samples, or indicating solutions, are first added to the wells 103 of MAP 102. Next, the sealing gasket 100 is placed onto the MAP 102. Then, cover 101 is placed on MAP 102 so that the projections 109 of cover 101 fit through the holes 108 in the sealing gasket 100 and into the individual wells 103 of MAP 102. Finally, the entire assembly is securely fastened together with machine screws 104 or other clamping means. This secure fastening ensures a constant optical pathlength through liquid samples 5 in each individual wells 103 of the MAP 102 and that individual liquid samples 5 are sealed off from one another, and the meniscus and evaporation effects are eliminated, even at elevated temperatures.

Alternative means for sealing the cover 1 to MAP 4 include employing O-rings affixed to the proximal portion (base) of the projections 109 near the bottom surface 120 of the cover 101. The O-rings are preferably of the same chemically-resistant material as previously noted for the sealing gasket 100. The inner and outer diameters of the O-ring are chosen to securely hold the O-ring on the base of each projection 109. The outer diameter of each O-ring is chosen to be slightly larger than the diameter of a well 103 (or sample site) of a MAP 102 so that when clamped, the O-ring will be compressed to seal each well. Any suitable clamping means may be employed including those employed with the sealing gaskets.

An alternative embodiment of the present invention is shown in FIGS. 15 and 16. As shown in FIGS. 15 and 16, the multi-assay plate ("MAP") 200 has wells 205 having covered portions 201 and an open portions 202. Liquid samples 5 can be added to and contained within MAP 200. Specifically, liquid samples 5 can be added through openings 204 of open portions 202 until each covered portion 201 is filled with liquid sample 5. Optical readings are made by passing light through the covered portions 201 in the Z—Z axis. The meniscus 203 and evaporation effects are maintained in open portions 202 but do not affect the optical readings through covered portions 201. Thus, a constant pathlength through liquid samples 5 in the Z—Z axis is maintained.

The foregoing detailed description of the invention has been made in general terms with respect to several preferred embodiments. Many of the preferred apparatuses and methods stated herein may be varied by persons skilled in the art without departing from the spirit and scope of the present invention as set forth in the following claims and equivalents.

What is claimed:

1. A sample well adapted for retaining fluid in a spectrophotometer comprising side walls, a top, and an optically transparent bottom window, where the side walls, the top, and the bottom window have inner surfaces, the inner surfaces cooperating to define a cavity;

the top comprising an optically transparent upper window and a hollow channel adapted for retaining a column of the fluid, the hollow channel being adjacent the upper window, and both the channel and upper window having an inner surface;

the inner surfaces of the upper window and the bottom window define an optical path having a constant optical pathlength through the fluid when the fluid is in contact with the channel inner surface; and where optical density readings of the fluid are taken along the optical path.

2. A multi-assay plate comprising a plurality of the sample wells of claim 1.

3. A sample well according to claim 1, wherein the sample well is capable of providing a constant optical pathlength through a liquid sample when disposed within a two-dimensional array of sample sites in a multi-assay plate.

4. A sample well according to claim 1, constructed and adapted such that the distance a beam of light must pass through the sample well including the upper and bottom windows and the fluid is substantially the optical pathlength through the fluid.

5. A sample well according to claim 1, wherein the top is attached to the side walls.

6. A sample well according to claim 1, wherein the channel is substantially cylindrical.

7. A multi-assay plate comprising a plurality of the sample wells of claim 6.

8. A multi-assay plate comprising 96 samples wells according to claim 7 disposed in an 8×12 array.

9. A sample well according to claim 1, where the volume of the cavity is such that a meniscus formed by from about 25 to 500 $\mu$l of liquid will simultaneously contact the inner surfaces of the top, the bottom, the side walls and the hollow channel.

10. A multi-assay plate comprising 96 samples wells according to claim 9 disposed in an 8×12 array.

11. A multi-assay plate comprising a plurality of the sample wells of claim 9.

12. A sample well adapted for retaining fluid in a spectrophotometer for performing optical density measurements comprising side walls, a top, and an optically transparent bottom window, where the side walls, the top and the bottom window have inner surfaces, the inner surfaces cooperating to define a cavity;

the top comprising (a) an optically transparent upper window having an inner surface, and (b) a channel having an opening above the upper window, the channel being adjacent the upper window and in fluid communication with the cavity; and where the inner surfaces of the upper window and the bottom window define an optical path having a constant optical pathlength through the fluid; and where optical density readings are taken along the optical path.

13. A sample well according to claim 12, wherein the top is attached to the side walls.

* * * * *